No. 12,272. REISSUED OCT. 11, 1904.

C. A. CONN.

OIL FILTER.

APPLICATION FILED APR. 28, 1903.

3 SHEETS—SHEET 1.

Witnesses:

F. E. Gaither

Herbert Bradley.

Inventor:

Charles Amasa Conn by Christy & Christy

Attys.

PHOTO-LITHOGRAPHED BY SACKETT & WILHELMS LITHO. & PTG. CO. NEW YORK.

No. 12,272. REISSUED OCT. 11, 1904.

C. A. CONN.

OIL FILTER.

APPLICATION FILED APR. 28, 1903.

3 SHEETS—SHEET 2.

Witnesses:

F. E. Gaither.

Herbert Bradley.

Inventor:

Charles Amasa Conn by Christy & Christy

Attys.

PHOTO-LITHOGRAPHED BY SACKETT & WILHELMS LITHO. & PTG. CO. NEW YORK.

No. 12,272. REISSUED OCT. 11, 1904.

C. A. CONN.

OIL FILTER.

APPLICATION FILED APR. 28, 1903.

3 SHEETS—SHEET 3.

WITNESSES:
Robert Gradley
F. E. Gaither

INVENTOR
Charles A. Conn
by Christy & Christy
Att'ys.

PHOTO-LITHOGRAPHED BY SACKETT & WILHELMS LITHG. & PTG. CO. NEW YORK.

No. 12,272. Reissued October 11, 1904.

UNITED STATES PATENT OFFICE.

CHARLES AMADY CONN, OF PITTSBURG, PENNSYLVANIA.

OIL-FILTER.

SPECIFICATION forming part of Reissued Letters Patent No. 12,272, dated October 11, 1904.

Original No. 718,428, dated January 13, 1903. Application for reissue filed April 28, 1903. Serial No. 154,731.

*To all whom it may concern:*

Be it known that I, CHARLES AMADY CONN, a citizen of the United States, residing in the city of Pittsburg, in the county of Allegheny and State of Pennsylvania, have invented certain new and useful Improvements in Oil-Filters, of which the following is a full, clear, and correct description.

My invention relates to improvements in an oil-filter; and it consists of certain details of construction, combination, and assembling of parts, which are fully described hereinafter, and shown in the accompanying drawings, of which—

Figure 1:
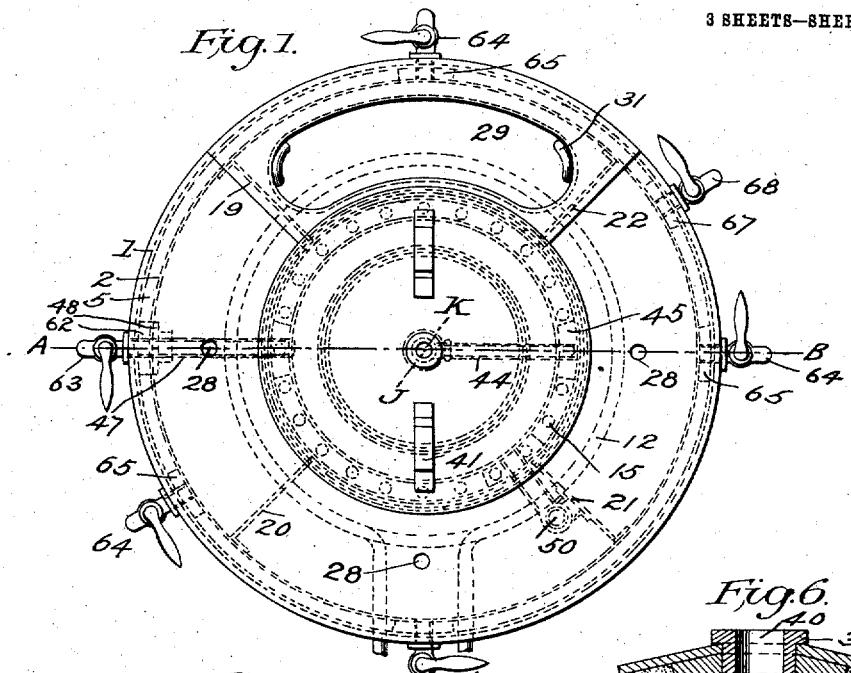
Figure 6:
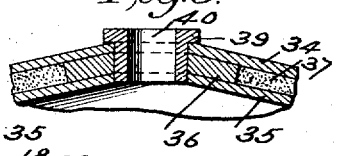
Figure 2:
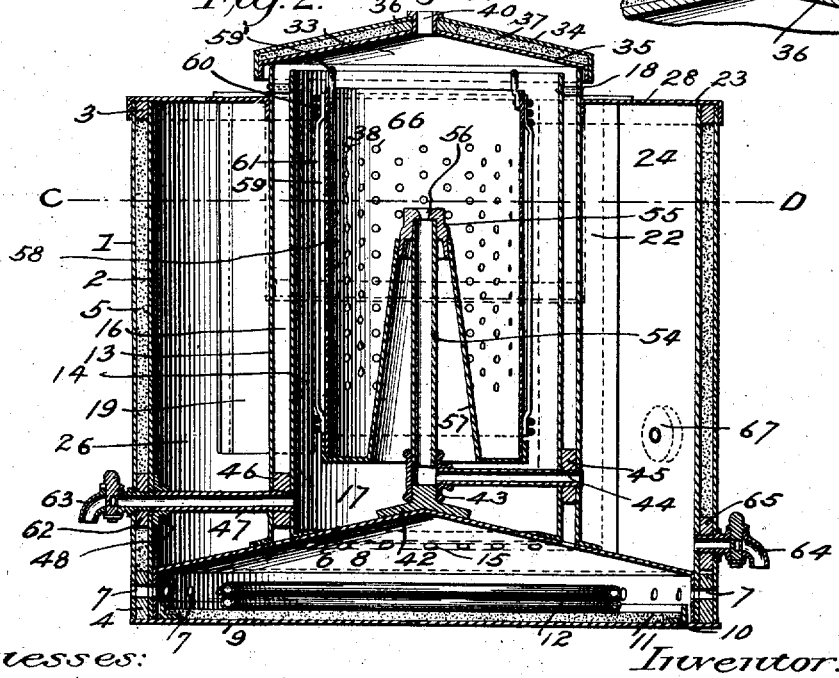
Figure 3:
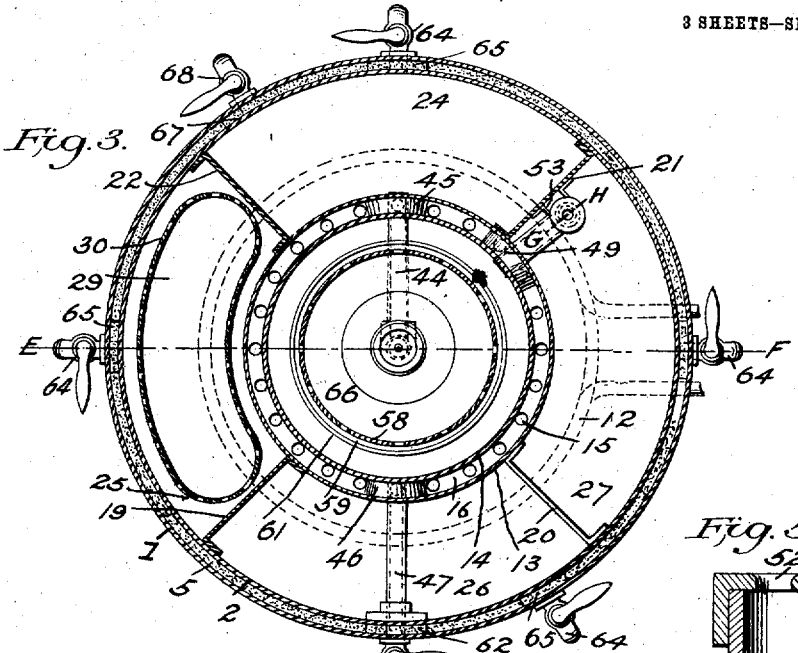
Figure 5:
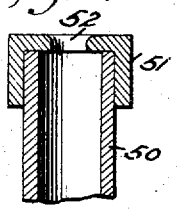
Figure 4:
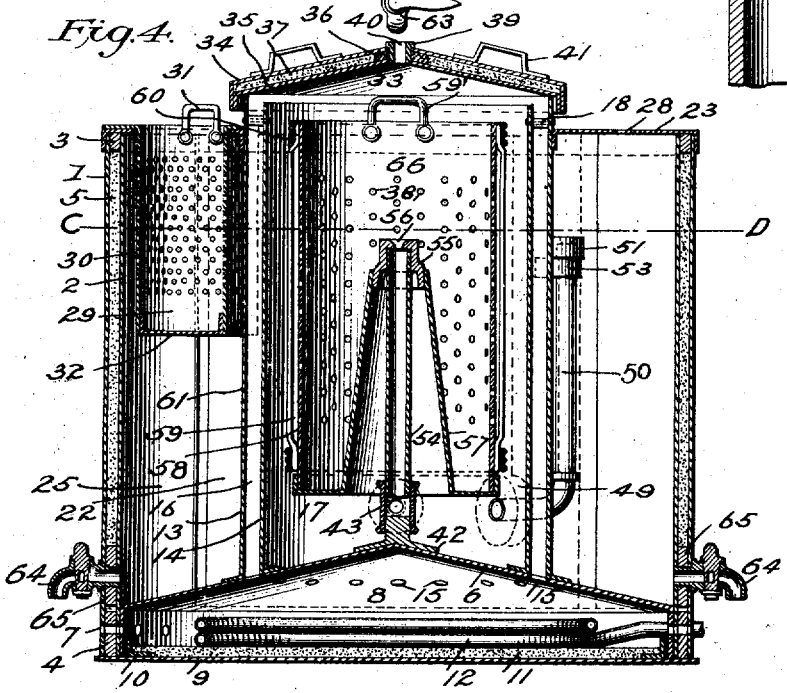
Figure 7:
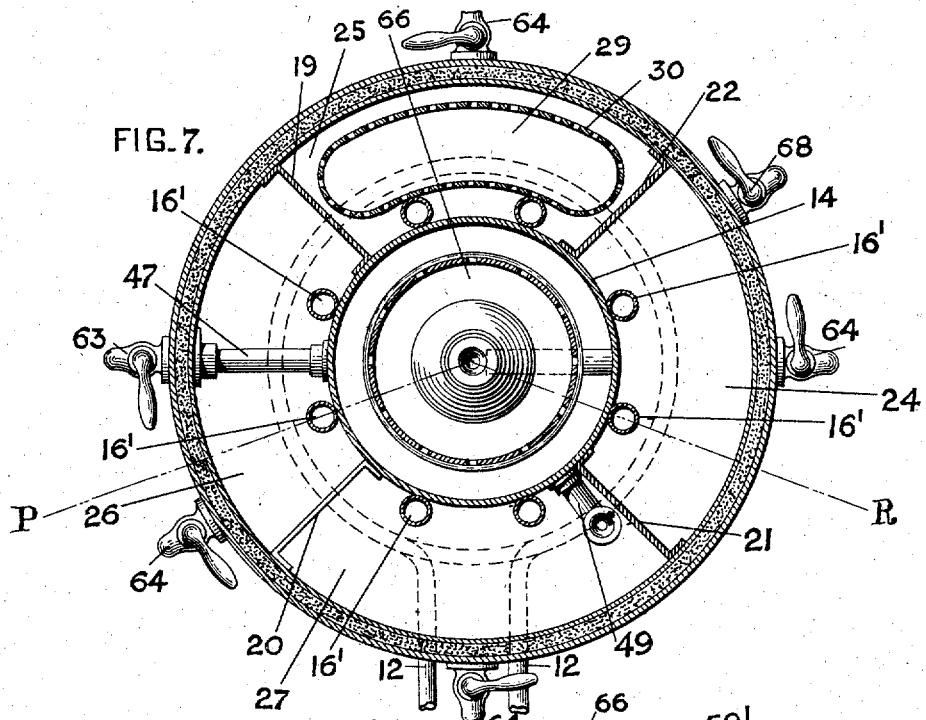
Figure 8:
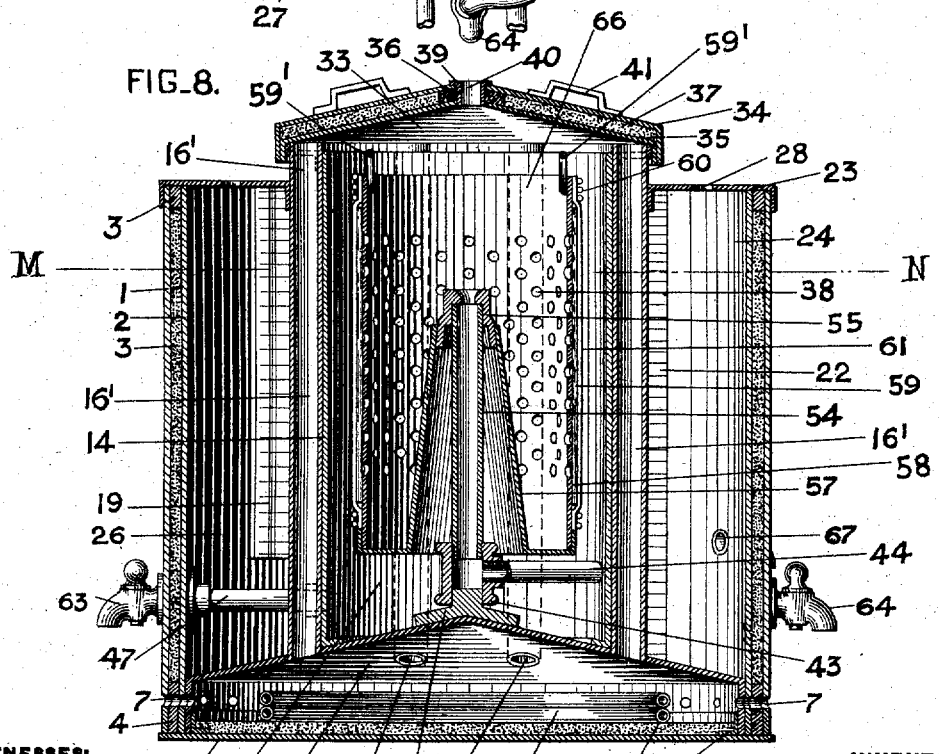

Figure 1 is a plan view of my improved oil-filter. Fig. 2 is a sectional elevation of the same, the section being taken on line A B of Fig. 1. Fig. 3 is a sectional plan view of my improved oil-filter, the section being taken through same on line C D of Figs. 4 and 2. Fig. 4 is a sectional elevation of my improved oil-filter, the section being taken through the same on the line E F of Fig. 3. Fig. 5 is an enlarged sectional view of the upper portion of the vertical pipe 50, the section being taken through the same on line G H of Fig. 3. Fig. 6 is an enlarged sectional view of a portion of the top of conical-shaped cover 33, the section being taken through same on line J *k* of Fig. 1. Figs. 7 and 8 illustrate a modified form of oil-filter embodying my invention, Fig. 7 being a horizontal section taken on line M N of Fig. 8, and Fig. 8 a vertical section taken on line P R of Fig. 7.

Similar numerals refer to similar parts throughout the views.

To put my invention into practice, I prefer constructing an oil-filter in the following-described manner:

I form of sheet metal two cylindrical shells 1 and 2, shell 1 being of larger diameter than shell 2. Said shells are separated by and riveted to the upper circular band 3 and the lower circular band 4, the intervening space 5 being filled with asbestos, magnesia, mineral wool, or other suitable material which is a poor conductor of heat. Securely attached to the base of said shell 2 is a conical-shaped bottom plate 6. Through the flanges of said bottom plate, the circular band 4, the lower part of shells 1 and 2, and extending in one or more rows around the tank are holes 7 for the purpose of admitting air into the lower heating-chamber 8. The circular plate 9, having the angle-strip 10 formed in a circle and conforming to the shape of the inside of flange of conical bottom plate and attached to the top of circular plate 9 for the purpose of keeping the tank on said circular plate, forms the base of said tank. Resting on said circular plate and between the said angle-strip is the layer of asbestos, magnesia, mineral wool, or other suitable material 11 which is a poor conductor of heat. Resting on said layer of material 11 is the coil of pipe 12, the outlet and inlet ends of which extend through the flange of conical-shaped bottom plate 6, the circular band 4, and the lower part of shells 1 and 2. Attached to said outlet and inlet ends are suitable connections for attaching steam-pipes thereto. The space between said conical-shaped bottom plate and circular plate 9 and inclosed by cylindrical shell 2 is called the "lower" heating-chamber 8. Resting on and securely attached and soldered to the said conical-shaped bottom plate concentric with the apex of said conical-shaped bottom plate are two cylindrical shells 13 and 14, shell 13 being of larger diameter than shell 14 and equal to about one-half the diameter of shell 1, shell 13 extending upwardly to a higher level than shell 14 and each extending to a higher level than shells 1 and 2. The lower ends of shells 13 and 14 are flanged and securely attached and soldered thereby to the said conical-shaped bottom plate. Through said conical-shaped bottom plate are a number of apertures 15, communicating with and placed in a row conforming to the shape of the annular heating-space 16 between shells 13 and 14. The space between said shells 13 and 14 and above said conical bottom is called the "annular" heating-chamber 16. The said apertures are for the purpose of admitting heated air from lower heating-chamber 8 into annular heating-chamber 16. The space inclosed by cylindrical shell 14 and extending from said conical bottom to top of said cylindrical shell is called the "central" purifying-chamber 17. The upper ends of said shells 13 and 14 are separated by metal separators 18, through which rivets are passed and firmly riveted to said shells. Between and securely attached to shells 2 and 13 and extending downwardly about three-fourths the distance from the top of shell 2 toward said conical-shaped bottom plate is the partition-wall 19. A similar partition-wall 20 is attached to said shells and to said conical bottom plate and extends upwardly about three-fourths the distance from said conical bottom plate toward the top of shell 2. There are also two other partition-walls 21 and 22 between and securely attached and soldered to said shells and to said conical bottom plate and extending upwardly to the level of the top of said shell 2, where they are attached and soldered to the cover-plate 23. Said cover-plate covers chambers 24, 25, 26, and 27. The space between said shells 2 and 13, the partition-walls 21 and 22, and extending from said conical bottom to said cover-plate is called the "clean-oil" reservoir 24. The spaces between said cylindrical shells 2 and 13 and the partition-walls 22 and 19, the partition-walls 19 and 20, and the partition-walls 20 and 21, and extending from said conical bottom to said cover-plate are called the "purifying-chambers" 25, 26, and 27, respectively. Said cover-plate is attached by its flanges to shell 1. An aperture of small size is made in said cover-plate communicating with each of purifying-chambers 26 and 27 and with clean-oil reservoir 24 for the purpose of vent-holes for volatile matter. A large aperture is made in said cover-plate over purifying-chamber 25 for the purpose of inserting and removing the receiving-strainer 29. The side 30 of said receiving-strainer 29 is formed of thin sheet metal, having small perforations extending around the side thereof, a strip of said metal being left unperforated at top and bottom, said strips extending around the sides of said strainer, the top strip being flanged for the purpose of supporting said strainer by overlapping said cover-plate. Securely attached to the said top at each end of said strainer are the handles 31. Securely attached to bottom strip of said strainer is the bottom plate 32. Resting on the cylindrical shell 13 is the conical-shaped cover 33, formed by joining two flanged conical-shaped sheets of metal 34 and 35, separated from each other by the annular separator 36, the intervening space being filled with asbestos, magnesia, mineral wool, or any other suitable material 37 which is a poor conductor of heat. The said annular separator is for the purpose of allowing the heated air from annular heating-chamber 16 to pass through the conical-shaped cover 33, there being apertures through sheets 34 and 35 corresponding to the size of the aperture in said annular separator. (See Fig. 6.) Inserted in said aperture through said cover is the flanged bushing 39, through the center of which is the opening 40, being of proper size to regulate the outlet of air from said annular heating-chamber, thereby maintaining the desired temperature of air in said annular heating-chamber. Securely attached to the top of said conical cover 33 are the handles 41 for the purpose of lifting said conical cover. Securely attached to the said conical-shaped bottom plate 6 at its apex is the base 42, which may be of cast-iron or other suitable metal, said base having a flanged base the under side of which conforms to the shape of said conical-shaped bottom plate and having a threaded stem projecting upwardly from its center. Screwed onto said stem is the tapped T 43, into the side of which is screwed the pipe 44, having its other end screwed into tapped flange 45, said tapped flange being securely fitted and soldered between cylindrical shells 13 and 14 for the purpose of conveying oil into clean-oil reservoir. Between said cylindrical shells is securely fitted and soldered the tapped flange 46 and screwed into which is the threaded end of drain-pipe 47, the other end of which is screwed into the tapped flange 48, which is securely attached and soldered to the side of cylindrical shell 2. Between and securely attached and soldered to cylindrical shells 13 and 14 is the tapped flange 49, into which is screwed the lower end of inlet-pipe 50, which is provided with an elbow for making the connection with the vertical stem of said inlet-pipe, the upper end of said inlet-pipe being threaded, onto which is screwed the tapped regulating-cap 51, having an aperture 52 through same communicating with the hole through said inlet-pipe, (see Fig. 5,) said aperture being of proper size to regulate the flow of oil from purifying-chamber 27 to central purifying-chamber 17, as hereinafter specified. The upper end of said inlet-pipe is attached to partition-wall 21 by band 53, which is securely riveted and soldered to said partition-wall. Screwed into the upper end of tapped pipe T 43, attached to base 42, is the threaded end of outlet-pipe 54, which extends upwardly from said T and having on its upper end, which is not threaded, the regulating-cap 55, having a recess for admitting the end of said outlet-pipe 54 and having an aperture 56 of proper size, as hereinafter specified, through the center of said cap communicating with the opening in outlet-pipe, thereby forming a shoulder for the cap to rest on said outlet-pipe. The outer edges of aperture 56 being rounded cause the easy flow of oil into said outlet-pipe. The flange of said regulating-cap extends downwardly and provides means of securely attaching conical-shaped filtering-head 57. Attached to the flange or conical filtering-head is the cylindrical shell 58, formed of sheet metal having perforations 38 therein and extending around said shell, a strip of metal being left unperforated at top and bottom. Attaching to the top strip and diametrically opposite each other are the two handles 59′. The space space 66 within the perforated cylindrical shell 58 is called the "filtering-chamber" 66. Securely attached and soldered to perforated cylindrical shell 58 is the woven-wire screen 59, encircling said cylindrical shell and extending from a little above the upper row to a little below the lower row of perforations. Encircling said woven-wire screen and extending from the top of said perforated cylindrical shell to the edge of flange of conical-shaped filtering-head 57 and securely held in place by cords or strings 60 is placed the layer of filtering materials 61, which may be of cloth or other suitable fibrous material. Between and securely attached and soldered to lower part of cylindrical shells 1 and 2 is the tapped flange 62, into which is screwed the threaded end of the cock 63, the opening in said flange communicating with the hole through drain-pipe 47, which is screwed into tapped flange 48, as heretofore described. Similar drain-cocks 64 and flanges 65 are attached to the lower portion of shells 1 and 2, communicating with the lower portion of purifying-chambers 25, 26, and 27 and clean-oil reservoir 24. Another flange, 67, and cock 68 for drawing off the clean oil are attached to shells 1 and 2 about one-fourth the distance from conical bottom plate 6 toward cover-plate 23 and communicating with the clean-oil reservoir 24.

Having described the construction of my improved oil-filter, the operation is described as follows: Steam is turned into steam-pipe coil 12 and allowed to circulate slowly through said coil, heating the coiled pipe, which in turn heats the air (which enters lower heating-chamber 8 through the small apertures 7) to about 180° Fahrenheit. The heated air then passes through apertures 15 into annular heating-chamber 16, where it heats the cylindrical shells 13 and 14 and passes out the aperture 40 of bushing 39, which is placed in the aperture of annular separator 36 of conical cover 33, the aperture 40 in said bushing 39 being of proper size to regulate the outlet of hot air from annular heating-chamber 16, thereby maintaining the desired temperature of air passing through said annular heating-chamber. The dirty waste oil containing small particles of gritty material and dirty and fibrous material after being used for lubricating the wearing parts of engines and various kinds of machinery is poured into the receiving-strainer 29. The fine particles of dirt, grit, &c., suspended in the oil pass with the oil through the small perforations in the side 30, leaving the coarse and fibrous material in said strainer. The oil, having entered purifying-chamber 25, becomes heated by the heated shell 13, which is kept hot by the hot air in the annular heating-chamber 16, and the heated oil becomes thin, thereby causing the coarser particles of suspended matter to be deposited at the bottom of said purifying-chamber. The oil, containing a much smaller amount of particles of grit, &c., passes under partition-wall 19 into purifying-chamber 26, where it is further exposed to the heated wall of said cylindrical shell inclosing said annular heating-chamber. More particles of suspended matter are deposited at the bottom of said purifying-chamber, the heated oil continues to rise in said purifying-chamber, and the volatile substances—such as water, &c.—which are intermingled with the oil begin to escape in the form of vapor through the vent-hole 28 in cover-plate 23. The oil after reaching the top of partition-wall 20 passes over said wall into purifying-chamber 27, where it is further exposed to the heated wall of cylindrical shell 13 and deposits more of the finer particles of grit, dirt, &c., held in suspension by the oil. The clarified oil collects in the upper portion of said purifying-chamber in the end opposite its entry over partition-wall more volatile matter may be vaporized and pass out through vent-hole 28. The clarified oil passes out of said purifying-chamber into the aperture 52 in the regulating-pipe 51, said aperture being of proper size to prevent any sudden rush of oil into central purifying-chamber by the filter being operated to its full capacity. The oil then descends into inlet-pipe 50. The top of said regulating-cap should be on the same level as the top of partition-wall 19 and the top of regulating-cap 55 on outlet-pipe 54 in filtering-chamber. The oil then passes through inlet-pipe 50 and enters central purifying-chamber 17, where it is further heated by the heated wall of cylindrical shell 14, which is kept hot by the hot air in annular heating-chamber 16. The oil being further liquefied by the increased heat deposits nearly all of the fine particles of grit and dirt which have been held in suspension while passing through the purifying-chambers 25, 26, and 27, said deposits collecting at the bottom of said purifying-chamber and may be drawn off through drain-pipe 47 by opening drain-cock 63. The sediment in purifying-chambers 25, 26, and 27, and the clean-oil reservoir 24 may also be drawn off through drain-cocks 64. The clarified oil in said central purifying-chamber 17 rises around the filtering-chamber 66 and passes through the filtering material 61, which may be of cloth or other fibrous material suitable for the purpose. The filtered oil then flows through the meshes of the woven-wire screen 59 to the perforations 38 in perforated cylindrical shell. Passing through said perforations, it enters filtering-chamber 66, where the filtered oil is given another opportunity to deposit any sediment. The filtered oil then passes into aperture 56, being of proper size to prevent the oil from passing out of said filtering-chamber beyond the desired rate of flow, thereby preventing any sudden rush of oil through said filtering material. The clear oil then passes through said aperture, flowing through outlet-pipe 54 into T 43, from whence it is conveyed through pipe 45 into clean-oil reservoir 24, where it is kept heated by the heated cylindrical wall 13 and is given a final opportunity to deposit any sediment which may have escaped through the filtering material. The clean oil may then be drawn off through the cock 68. The filter being jacketed with a material which is a so-called "non-conductor" of heat enables the heated oil to retain much of its heat more uniformly throughout. Also the objectionable feature of externally-heated filters increasing the temperature of the confined air in basement engine-rooms is overcome by the use of said jacket of non-conducting material, and a workmanlike appearance is given the filter by the external shell 1, inclosing said material, which is a non-conductor of heat. The pressure of the oil being against the outside of filtering-chamber 66, the filtering material is easily kept in place by the bands or strings 60, and the fibers of said filtering material are not overtaxed. The object of the woven-wire screen 59 is to separate the filtering material from the perforations in the perforated cylindrical shell, thereby giving large filtering area to the filtering material and allowing the free circulation of oil between the meshes of said woven-wire screen to said perforations in perforated cylindrical shell. The object in heating the oil by hot air and heating the oil from the interior annular heating-chamber is to heat the oil more uniformly and not burn or injure the oil, as would be done by volatilizing some of its elements which have value as lubricants, and the oil is also heated to the required temperature to thin the oil while it surrounds and is passing through the filtering material, thereby imparting the highest permissible heat to the oil while the filter is doing its important work.

I do not care to confine myself to the use of the annular heating-chamber 16, as I may use one or more tubes or passages for hot air, which register with one or more apertures through said conical-shaped bottom plate 6, and said tubes or passages for hot air may extend upwardly through said filter for the purpose of allowing the heated air from said lower heating-chamber 8 to pass upwardly through said filter and heat the oil. Such a filter is illustrated in Figs. 7 and 8, the numeral 16′ designating the tubes or passages for hot air.

I am aware of the fact that prior to my invention there have been many oil-filters on the market; but

What I claim as new, and desire to secure by Letters Patent, is—

1. In an oil-filter, the combination with an outer inclosing wall, of a plurality of connected oil-chambers, and a plurality of heating-chambers, arranged within said outer wall, substantially as described.

2. In an oil-filter, the combination with an outer inclosing wall, of an annularly-constructed heater arranged within said outer wall, and a heat-distributing chamber communicating with said heater, substantially as described.

3. In an oil-filter, the combination with an outer inclosing wall, of a plurality of connected oil-chambers, and an annularly-constructed heater, arranged within said outer wall, substantially as described.

4. In an oil-filter, the combination with an outer inclosing wall, and an annularly-constructed heater within said outer wall, of an oil-chamber arranged between said heater and said outer wall, and a second oil-chamber within said heater and connected with the outer oil-chamber, substantially as described.

5. In an oil-filter, the combination with an outer inclosing wall, and an annularly-constructed heater within said outer wall, of a plurality of connected oil-chambers arranged around said heater and within said outer wall, and an oil-chamber within said heater and connected to said outer oil-chambers, substantially as described.

6. In an oil-filter, the combination with an outer inclosing wall, and an annularly-constructed heater within said outer wall, of an oil-receiving chamber and an oil-delivery chamber, both arranged between said heater and said outer wall, and a chamber within said heater and connected to said outer chambers, substantially as described.

7. In an oil-filter, an outer inclosing wall, double bottoms attached to said outer inclosing wall forming a heating-chamber between said bottoms, the inclosing wall of said heating-chamber being provided with apertures, two inner walls forming a heating-chamber, said inner walls being arranged within the said outer inclosing wall and extending upwardly through said filter, communication being had between the said heating-chamber between said bottoms and the said heating-chamber formed by the said inner walls, substantially as specified and for the purpose stated.

8. In an oil-filter, an outer inclosing wall, double bottoms attached to said outer inclosing wall forming a heating-chamber between said bottoms, the inclosing wall of said heating-chamber being provided with apertures, two inner walls forming a heating-chamber, said inner walls being arranged within the said outer inclosing wall and extending upwardly through said filter, communication being had between the said heating-chamber between said bottoms and the said heating-chamber formed by the said inner walls, a removable cover carried on the outer one of said inner walls, said removable cover being provided with an aperture, substantially as specified and for the purpose stated.

9. In an oil-filter, an outer inclosing wall, double bottoms attached to said outer inclosing wall forming a heating-chamber between said bottoms, the inclosing wall of said heating-chamber being provided with apertures, two inner walls forming a heating-chamber, said inner walls being arranged within the said outer inclosing wall and extending upwardly through said filter, communication being had between the said heating-chamber between said bottoms and the said heating-chamber formed by the said inner walls, a removable cover carried on the outer one of said inner walls, said removable cover being provided with an aperture, and having a removable bushing placed in said aperture through said removable cover, said bushing being provided with an aperture, substantially as specified and for the purpose stated.

10. In an oil-filter, an outer inclosing wall, double bottoms attached to said outer inclosing wall forming a heating-chamber between said bottoms, the inclosing wall of said heating-chamber being provided with apertures, inner walls forming heating-chambers, said inner walls being arranged within the said outer inclosing wall and extending upwardly through said filter, communication being had between the said heating-chamber between said bottoms and the said heating-chambers formed by the said inner walls, substantially as specified and for the purpose stated.

11. In an oil-filter, an outer inclosing wall, a bottom attached to said outer inclosing wall, inner walls forming heating-chambers, said inner walls being arranged within the said outer inclosing wall and extending upwardly through said filter, the said bottom being provided with apertures forming means of communication between said heating-chambers and the outside air, substantially as specified and for the purpose stated.

12. In an oil-filter, the combination with a plurality of connected oil-chambers, of a heat-distributing chamber, and a heating-chamber in communication with the heat-distributing chamber and extending into the filter, substantially as described.

13. In an oil-filter, the combination with a plurality of connected oil-chambers, of a heat-distributing chamber, and a plurality of heating-chambers in communication with the heat-distributing chamber and extending into the filter, substantially as described.

In witness whereof I affix my signature in the presence of two witnesses.

CHARLES AMADY CONN.

Witnesses:
MARSHALL A. CHRISTY,
F. E. GAITHER.